United States Patent [19]

Kelly et al.

[11] Patent Number: 4,670,477
[45] Date of Patent: Jun. 2, 1987

[54] PROCESS FOR PREPARING IN SITU RETICULATED POLYURETHANE FOAM

[75] Inventors: David J. Kelly, Chadds Ford; Paul J. Cacciatore, Chester, both of Pa.

[73] Assignee: Scotfoam Corporation, Eddystone, Pa.

[21] Appl. No.: 817,456

[22] Filed: Jan. 9, 1986

[51] Int. Cl.$^4$ .............................. C08J 9/14; C08J 9/38
[52] U.S. Cl. ....................................... 521/52; 521/97; 521/98; 521/130; 521/133; 521/137
[58] Field of Search .................................. 521/52, 137

[56] References Cited

U.S. PATENT DOCUMENTS

| | | |
|---|---|---|
| 3,165,483 | 1/1965 | Gemeinhardt et al. ............... 521/52 |
| 3,178,300 | 4/1965 | Gemeinhardt et al. ............... 521/52 |
| 3,433,752 | 3/1969 | Zagoreu et al. ....................... 521/52 |
| 3,454,504 | 7/1969 | Murai et al. ......................... 521/110 |
| 3,748,288 | 7/1973 | Winkler et al. ....................... 521/52 |
| 3,884,848 | 5/1975 | Ricciardi et al. .................... 521/110 |
| 4,167,612 | 9/1979 | Tucker et al. ......................... 521/52 |

*Primary Examiner*—Morton Foelak
*Attorney, Agent, or Firm*—Connolly & Hutz

[57] ABSTRACT

An improved process for in situ production of a reticulated, open-cell polyurethane foam which comprises reacting a polyester/polyether polyol mixture with an aromatic polyisocyanate having a ratio of isocyanate moieties to aromatic moieties of about 2:1 in the presence of a catalyst and a blowing agent,
the improvement comprises:
said polyol mixture being
(a) 80 to 95 parts by weight of polyester polyol and
(b) 20 to 5 parts by weight of polyoxypropylene polyether polyol or a mixed poly(oxyethylene/oxypropylene polyether polyol, each having at least one polymer of ethylenically unsaturated monomers dispersed therein and a stabilizing surfactant for polyether polyurethane foam,
and said process produces a polyurethane foam which has excellent strength properties and an exceeding low resistance to air flow.

14 Claims, No Drawings

PROCESS FOR PREPARING IN SITU RETICULATED POLYURETHANE FOAM

The present invention relates to production of polyurethane foam which has a low resistance to air flowing therethrough due to its highly open structure.

BACKGROUND OF THE INVENTION

Cellular solid polymers, often referred to as "foams" can be prepared by generating a gas during the polymerization of the liquid reaction mixture. The gas generated causes foaming of the reaction material which is normally in a plastic or liquid state. The polymerization reaction continues while the foaming occurs until the polymer sets or gels into the cellular pattern formed by the foam bubbles. The solidified polymer thus becomes a cellular solid mass popularly known as a "foam". Polyurethane foams are generally prepared by the reaction of an active hydrogen-containing compound and a polyisocyanate, in the presence of a blowing agent such as water, and usually, a reaction catalyst and foam stabilizer.

Polyurethane foam is used widely as a flexible cellular product in the comfort cushion market (furniture, bedding, automotive); in the textile area (apparel, blankets); in the industrial packaging and insulating fields; in other household furnishings and sponges; filters, and the like. The versatility of polyurethane foam, permitting its use in diverse markets, results in substantial part from the nature and variety of the raw materials which are used to produce the foam products, as well as the manner in which the raw materials and the resultant foam are processed. Foams ranging widely in density and hardness, in tensile and tear properties, in resistance to compression set and fatigue, in resilience and hysteresis, in durability and toughness are obtained by selection and variation in raw materials and processing conditions. An important further characteristic in foam that likewise varies widely is its breathability, or resistance to air flow, of the basic cellular structure.

The cellular solid polymer foam has a skeletal framework of relatively heavy strands forming an outline for the cell structure. The strands of the skeletal framework are conventionally connected by very thin membranes, or windows, which form the walls of the cells. In open-celled foams, some of the windows are open or torn in each cell thus forming an interconnecting network open to air flow. However, conventional polyurethane foams are not sufficiently porous or open-celled to exhibit very low resistance to air flow therethrough which are required for many utilities, such as filtering. Accordingly, in attempting to improve the properties of such open-celled foams in a desired direction, the art has tried various post-forming methods of reticulating, or increasing the degree of openness, by breaking or removing the residual cell windows of such foams. Chemical, mechanical and thermal reticulation means have all been used.

For example, removing cell walls has been suggested by using the hydrolyzing action of water in the presence of an alkali metal hydroxide. By carefully adjusting the conditions during the hydrolysis reaction, it has been demonstrated that cell windows can be removed without adversely affecting the skeletal framework. Reticulation can also be carried out by melting the windows by, for example, a high temperature flame front to heat the cell windows or walls to above the melting point of the polymer. Thus, it was proposed that by carefully regulating the conditions under which this process is carried out, the cell windows can be melted without adversely affecting or melting the skeletal strands.

Various purely mechanical means to reticulate both flexible and rigid foams have also been suggested. For example, the art has utilized a procedure of compressing, mangling or wringing a flexible foam to open the pores to render it more useful as a sound insulating or sound absorbing medium. Foams have been made more open, to improve sound absorbing properties, by heating with super-heated steam at 140° C., or by blowing with compressed air or high velocity liquids.

Whatever post treatment is used, it must of necessity produce some effect upon the stalk or skeletal structure of the foam regardless of how minimal such effect is. In many cases, when working with a pigmented foam, the color intensity and hue are substantially changed by the post-polymerization reticulation treatment. This can result in some difficulty in color matching for certain applications. Moreover, post-treatment methods add significantly to the cost of the foam. Therefore, a method for producing a substantially open-celled non-lustrous foam in situ during the reaction or foaming process, without the necessity of an additional post polymerization treatment step, has long been sought and would be an advance in the art.

The art has been at least partially successful in obtaining open-celled polyether type polyurethane wherein the polyurethane is prepared using a polyhydric polyether as the active hydrogen-containing reactant. For example, in U.S. Pat. No. 3,433,752, an open-celled, rigid, polyether polyurethane foam is produced by the addition of an alkali metal salt of a sulfonated high molecular weight fatty acid. In Canadian Pat. No. 797,893, the preparation of a polyalkylene ether polyurethane having an open structure is disclosed which includes the addition of a petroleum hydrocarbon liquid, e.g., kerosene or mineral oil, as a cell opening agent which causes the cell membranes of the foam to rupture during the foaming process, thus allegedly providing an open material. The intent of this process is to prevent shrinking of the foam during cooling which often occurs with a substantially fully closed cell structure. However, the above process is explicitly limited to polyalkylene ether polyurethane and does not result in a completely open structure, but merely one in which sufficient membranes are removed to permit at least some air permeability throughout the internal foam structure. Also see U.S. Pat. No. 3,454,504.

In Canadian Pat. No. 797,892, an open-celled polyether polyurethane foam material is obtained by the reaction of a polyhydric polyether compound with an organic polyisocyanate and blowing agent in the presence of an inert organic liquid solvent such as methylene chloride, acetone, hexane or pentane.

U.S. Pat. No. 3,178,300 describes a process for preparing "skeletal" polyurethane foam by mixing an organic polyisocyanate with castor oil in the presence of an alkyl silane oxyalkylene block copolymer (a surfactant), a blowing agent and a monohydric organic compound, such as a monohydric alcohol or monocarboxylic acid. This material has a limited usefulness, however, because of the low structural strength caused by the chain-stopping monohydric additive, which limits its strength, and the relatively coarse cell structure. Further, castor oil is notoriously difficult to use as a sole polyhydroxy reactant. The reaction with castor oil is highly exothermic, often causing scorching or even burning of the foam, and often the formation of odoriferous by-products.

U.S. Pat. No. 3,165,483 describes a process for making a skeletal foam by reacting a polyisocyanate with either castor oil or a polyhydric polyether in the presence of a silane-oxyalkylene block copolymer and of an unreactive hydrocarbon or halohydrocarbon, ester, aldehyde and/or ketone. These materials are also indicated to be useful as filters.

U.S. Pat. No. 3,748,288 describes production of an open polyester-type urethane foam by the addition of a minor proportion of a polyether polyol reagent and a small amount of a hydrophobic, anti-foaming organo-silicone compound. U.S. Pat. No. 3,884,848 describes the replacement of the hydrophobic, anti-foaming organo-silicone compound with at least one ester of the formula $(RCOO)_nR'$, wherein R and R' are alkyl or alkenyl groups having from one (1) thirty (30) carbon atoms, at least three carbon atoms, and n is an integer from one (1) to three (3).

BRIEF DESCRIPTION OF THE INVENTION

It has now been discovered that an extremely stable highly reticulated, open-celled polyester-type polyurethane foam with excellent physical properties can be directly produced, in-situ, from conventional foam making formulations if about 5 to 20% by weight of the polyester polyol reactant is replaced by a modified polyether polyol. In the context of the present invention, a "modified" polyether polyol means a polyether polyol having dispersed therein either polymers of ethylenically unsaturated monomers such as polyacrylonitrile, polystyrene, and poly(styrene coacrylonitrile), or polyurea.

In addition to negating the need for a small amount of hydrophobic, anti-foaming organo-silicone compound or an ester of the formula $(RCOO)_nR'$ as described above, this discovery yields an in situ open-celled polyester polyurethane foam with much better physical properties than the aforementioned art.

Accordingly, it is a primary object of the present invention to produce a flexible polyurethane foam having very low resistance to air flow which can be produced in situ.

It is another object of the present invention to produce foam having the advantageous characteristics of a reticulated structure without sacrificing the strength of the skeletal structure of the foam.

It is still another object of this invention to provide selection of raw materials which will produce strong, resilient, highly breathable foam products free of defects caused by prior art reticulating means and which can be processed on conventional foam processing equipment.

The aforesaid and other objects of the present invention will become fully apparent from the following description.

DETAILED DESCRIPTION

Conventionally, flexible polyester polyurethane foams are produced by reacting a polyisocyanate with a polyester polyol in the presence of water which reacts to form a gaseous blowing agent. By replacing a small amount of the polyester polyol reactant with a modified polyether polyol, an extremely stable highly reticulated foam can be produced in situ and troublesome additives can be avoided. An amount 5 to 20% by weight of the polyester polyol can be replaced by the modified polyether polyol. Use of more than 20% by weight, based on total polyol, of modified polyether polyol results in a foam which has a high resistance to air flow and is considered to be not reticulated. With amounts up to 5% of modified polyether polyol an unstable system is produced and the foam collapses before curing. An amount of from about 8 to 15% by weight of modified polyether polyol, based on total polyol, is preferred and about 10% is most preferred.

Thus this invention concerns an improved process for in situ production of a reticulated, open-cell polyurethane foam which comprises reacting a polyester/polyether polyol mixture with an aromatic polyisocyanate having a ratio of isocyanate moieties to aromatic moieties of about 2:1 in the presence of a catalyst and a blowing agent, the improvement comprises:
said polyol mixture being
(a) 80 to 95 parts by weight of polyester polyol and
(b) 20 to 5 parts by weight of
  (i) polyoxypropylene polyether glycol or
  (ii) a mixed poly(oxyethylene/oxypropylene) polyether polyol,
into which is dispersed polymers of polyurea or ethylenically unsaturated monomers, such as polyacrylonitrile, polystyrene, or poly(styrene coacrylonitrile)or.

Modified polyether polyols are typically poly(oxyethylene/oxypropylene) ether polyols into which is dispersed poly(styrene coacrylonitrile), or polyurea. Modified polyether polyols are commercially available from several companies, including Union Carbide (supplied as "Polymer Polyol"), BASF (supplied as "Graft Polyol"), Dow (supplied as "Co-polymer Polyol"), and Mobay (supplied as PHD Polyol). Union Carbide, BASF, and Dow use the poly(styrene coacrylonitrile) system, whereas Mobay uses the polyurea system. Some examples of commercially available modified polyether polyols are as follows:

TABLE I

| POLYETHER POLYOL | TYPE |
|---|---|
| Union Carbide | E488 |
| "Polymer Polyols" | E547 |
|  | E464 |
|  | E543 |
|  | E363 |
|  | E579 |
| BASF | P994LV |
| "Graft Polyols" |  |
| Dow | XAS-10946 |
| "Copolymer Polyols" | XAS-10963 |
| Mobay | E9232 |
| "PHD Polyols" |  |

Some modified polyether polyols can be prepared by the procedure described by Critchfield et al, *Rubber Chemistry and Technology*, Vol. 45, No. 5, pp. 1467–1477 (1972) and U.S. Pat. No. Re. 23,817. A polyether polyol (e.g., polyoxypropylene polyol) is reacted with styrene and acrylonitrile in the presence of a free radical catalyst and the resulting modified polyether polyol is isolated.

The polyester polyol used in this invention is selected from conventional polyester polyols known to those skilled in the art to be suitable in polyurethane foam production. The polyester polyol reactant usually has a molecular weight of at least about 400 and optimally between about 500 and about 5000 as determined by molecular weight average. The hydroxyl number of the compound is correspondingly in the range of from about 15 to about 300. Generally a polyester having a molecular weight average of about 3000 and a hydroxyl functionality of 2 to 3 is preferred. The polyesters are obtained by esterification of polycarboxylic acids (or their acid halides or anhydrides) with polyhydric alcohols.

The preferred acids are the dicarboxylic acids containing from about 4 to about 12 carbon atoms in the molecule. Examples of such preferred carboxylic acid compounds which can be used include, for example, aromatic acids such as phthalic acid, terephthalic acid, isophthalic acid, tetrachlorophthalic acid, cycloaliphatic acids such as dimerized linoleic acid, maleated and fumarated rosin acids and cyclohexane-1,4-diacetic acid, but especially the aliphatic acids such as tricarballylic, oxydipropionic, succinic, glutaric, adipic, azelaic, suberic, sebacic acids, or combinations of such acids. The polyester polyols can also be prepared from corresponding lactones, such as gamma-butyrolactone or epsilon-caprolactones, for example.

The polyhydric alcohol used in the preparation of this polyester polyol is generally a mixture of a dihydric and a trihydric, or polyhydric alcohol of high hydroxyl value. Preferably, a mixture of polyols, the major portion having a functionality of two and the minor portion having a functionality of three is used. This mixture of di- and tri-functional polyols is utilized to give an average functionality of between two and three. A functionality of greater than two is desirable to provide cross-linking in the reaction between the polyester polyol and the polyisocyanate to form a flexible, but strong foam. It has been found to be preferable to obtain this additional functionality by using trihydric or higher polyols in a minor amount when forming the polyester polyol.

For preparing flexible foams, the polyols most preferably include the glycols, such as neopentyl glycol, ethylene glycol, diethylene glycol, hexamethylene glycol, 1,4- and 1,3-butylene glycol, 1,3- and 1,2-propylene glycol and the corresponding dipropylene glycols. The most useful monomeric triols include the aliphatic triols, such as trimethylolethane, trimethylolpropane, 1,2,4-butanetriol, 1,2,6-hexanetriol, glycerol, and triethanolamine. Aromatic polyols can also be used, such as trihydroxymethyl benzene and a functionality close to 3.

The most preferred polyester polyol reactant is diethylene glycol adipate polyester polyol having a molecular weight of about 3000.

The polyisocyanate used in this invention is likewise a conventional material used in producing polyurethane foam. Preferably, the polyisocyanate is toluene diisocyanate (TDI). However, other polyisocyanates having a ratio of isocyanate groups to aromatic rings of about 2:1 are suitable and include phenylene diisocyanate, naphthalene diisocyanate, diphenyl-4,4'-diisocyanate and xylene diisocyanate.

In addition to the polyol mixture of this invention conventional blowing agents and catalysts are employed to produce the polyurethane foam. Water and/or readily volatile organic substances are used as blowing agents in the process according to the invention. The blowing agent is employed in an amount from about 1 to about 15 parts by weight per 100 parts by weight of total polyol reactant, the particular blowing agent and amount thereof depending upon the type of foam product desired. Flexible foam formulations usually contain up to about six pphp of water. The selection and amount of blowing agent in any particular foam formulation is well within the skill of the cellular polyurethane art. Suitable organic blowing agents are acetone, ethyl acetate, halogenated alkanes, such as methylene chloride, chloroform, ethylidene chloride, vinylidene chloride, monofluorotrichloromethane, chlorofluoromethane or dichlorodifluoromethane, butane, hexane, heptane or diethyl ether. A blowing effect can also be obtained by adding compounds which decompose at temperatures above room temperature to liberate gases, for example, azo compounds such as azoisobutyric acid nitrile which liberate nitrogen.

Catalysts and surfactants are also frequently used in the process according to the invention. Conventional catalyst/surfactant systems differ depending on whether a polyester polyol or a polyether polyol is used to produce foam. It is a significant part of the present invention that a conventional polyether polyol-type catalyst/surfactant system is used, even required. It has been discovered that in the process of this invention a polyester polyol-type catalyst/surfactant system cannot be used because the foam is unstable and collapses even though the majority of polyol is polyester polyol. It was unexpectedly discovered that a polyether polyol-type catalyst/surfactant system produced quite different results. The catalysts used are known and include tertiary amines such as triethylamine, tributylamine, N-methyl-morpholine, N-ethyl-morpholine-N-ocomorpholine, N,N,N',N'-tetramethylethylenediamine, 1,4-diaza-bicyclo-(2,2,2)-octane, N-methyl-N'-dimethylaminoethyl-piperazine, N,N-dimethyl benzylamine, bis-(N,N-diethylaminoethyl)-adipate, N,N-diethylbenzylamine, pentamethyl diethylenetriamine, N,N-dimethylcyclohexylamine, N,N,N',N'-dimethyl-phenylethylamine, 1,2-dimethylimidazole and 2-methylimidazole, triethylene diamine, bis(2-dimethylamino ethyl)ether.

The tertiary amines which contain hydrogen atoms capable of reacting with isocyanate groups include triethanolamine, triisopropanolamine, N-methyldiethanolamine, N-ethyldiethanolamine, N,N-dimethylethanolamine or their reactions products with alkylene oxides such as propylene oxide and/or ethylene oxide, 2,2,4-trimethyl-2-silamorpholine or 1,3-diethylaminomethyl-tetramethyl-disiloxane.

The catalysts used may also be bases which contain nitrogen such as tetraalkyl ammonium hydroxides or alkali metal hydroxides such as sodium hydroxide, alkali metal phenolates such as sodium phenolate or alkali metal alcoholates such as sodium methylene. Hexahydrotriazines may also be used as catalysts.

Organic metal compounds may also be used as catalysts according to the invention, especially organic tin compounds, which are the preferred catalysts.

Organic tin compounds used are preferably tin (II) salts of carboxylic acids such as tin (II)-acetate, tin (II) octoate, tin (II)-ethylhexoacte and tin (II)-laurate and the dialkyl tin salts of carboxylic acids such as dibutyl tin diacetate, dibutyl tin dilaurate, dibutyl tin maleate or dioctyl tin diacetate.

The catalyst is generally added in amounts of from about 0.05 to about 2 weight percent and preferably from about 0.1 to about 1 weight percent, based on the total weight of the active hydrogen-containing compounds present in the reaction, i.e., the polyester polyol and the polyether polyol.

It is conventional wisdom in the art, to utilize a foam-stabilizing emulsifier-surfactant and foaming agent in balanced proportions to obtain a foam of a desired cell size, structure and density. Generally, the emulsifier-surfactant is balanced with the amounts of catalyst and water to obtain the desired foam.

The foam-stabilizing emulsifiers used in the present invention are polymeric organo-silicon compounds which are partially hydrophilic and compatible with at least one of the polyols. Such organo silicon surfactant-emulsifiers are well known to the art, described extensively in the published literature, and sold commercially. The commercially available organo silicon surfactant-emulsifiers are generally sold with specific instructions as to their suitability for polyether polyol-type urethane foam production. As noted above, a surfactant-emulsifier suitable for one polyol type is not suitable for use in a foaming reaction based on the other type. Further, these surfactant-emulsifiers are proprietary products, sold without disclosure as to their precise chemical structure. However, the surfactant-emulsifiers used for polyether polyol-containing reaction mixtures are known to depress the surface tension to a greater extent than do the organo silicon surfactants used with polyester polyols.

In the process of the present invention, however, where the urethane foam is prepared from a reaction mixture containing as the major portion of the polyol reagent a polyester polyol, it is surprising that the surfactant-emulsifiers which are most effective, are the type commercially used with polyether polyols.

The most generally available organo silicon emulsifier surfactants are polymers which contain a plurality of silicon atoms (which form part of the hydrophobic portion of the polymer molecule) and a long chain hydrophilic group, for example, including a polyoxyalkylene ether group. In the more common organo silicon emulsifier surfactant compounds, the silicon is present as a siloxane group, i.e., —Si—O. These compounds are described in detail in U.S. Pat. No. 3,884,848 which description is hereby incorporated by reference.

Although foaming of the present resin reactant is effected simply, it is also possible to add, although not necessary, supplemental foaming materials or functional additives, e.g., fillers, absorbants, antioxidants, enzymes, dyes, fire retardants, pigments, biocides, and the like, such as those well known to the artificial sponge foaming art. The additives can either be inert and thus physically held in the foam structure, or chemically reactive with reactive species in the resin reactant in which case the additive may be bound chemically into the foam product.

Production of foam by the process of this invention can be achieved by use of a conventional foam making machine operated in the manner currently known to those skilled in the art. Reactants and additives are mixed together and allowed to rise and react freely on a moving casting conveyor in the known manner, and then cured to produce large slabs of a reticulated foam having low resistance to fluid (e.g., air) flow.

The following examples will aid in explaining, but should not be deemed as limiting, practice of the present invention. In all cases, unless otherwise noted, all parts and percentages are by weight.

EXAMPLE 1

A polyol mixture is prepared from 90 parts of a diethylene glycol adipate polyester polyol having a molecular weight of 3000 and 10 parts of a modified polyether polyol sold by Union Carbide Corporation under the name Niax E488, which is a polymer polyol. That polyol mixture (100 parts) is reacted with toluene diisocyanate (52 parts), water (4 parts), organotin catalyst (0.8 parts), amine catalyst (0.9 parts), and a silicone surfactant (1.0 parts) under foaming conditions wherein the cream time is 12 seconds, the rise time is 105 seconds with a strong gel strength. The catalysts are stannous octoate (in dioctyl phthalate in a ratio of 1:2) and C124 (Niax A-1, a proprietary tertiary amine product of Union Carbide, in dipropylene glycol in a ratio of 1:6). The silicone surfactant is L6202, a poly(siloxane)/poly(ether) co-polymer from Union Carbide. The product is a highly reticulated polyurethane foam.

EXAMPLE 2

(Comparison)

As a comparison, the procedure of Example 1 is repeated except that the polyol reactant contains no polyether polyol and is all polyester polyol, and the catalysts and surfactant systems are those typically used for polyester foam. During the foaming, a cream time of 9 seconds and a rise time of 64 seconds are noted with only a weak to moderate gel strength. The following Table II presents the properties of the foams of Example 1 and 2.

TABLE II

|  | Ex. 1 As-Made | Ex. 2 As-Made | Ex. 2 Thermally Reticulated |
|---|---|---|---|
| Density (lbs./ft$^3$) | 1.77 | 1.80 | 1.68 |
| Air Permeability (ft$^3$/min/ft$^2$) | 501.0 | 6.2 | 365.0 |
| Tensile Strength (lbs/in$^2$) | 15.6 | 18.2 | 21.9 |
| Elongation (%) | 158.0 | 115.0 | 197.0 |
| Tear Strength (lbs/in) | 2.8 | 2.8 | 3.6 |
| CLD (lbs/in$^2$)-25% | 0.45 | 0.69 | 0.50 |

EXAMPLE 3

To study the effects of the amount of modified polyether polyol on foam characteristics, Example 1 is repeated using 5 parts, 15 parts and 20 parts of Niax E488 in place of the 10 parts of Example 1. Properties of the resulting foam are summarized in Table III below.

TABLE III

| Parts polyether polyol per 100 parts total polyol | DEN | AIR PERM. | PPI* | CLD$_{25}$ | TEN. | EL. | TEAR |
|---|---|---|---|---|---|---|---|
| 5 | 2.27 | 410 | 15 | 0.60 | 12.6 | 91 | 2.2 |
| 10 | 1.77 | 501 | 65 | 0.45 | 15.6 | 158 | 2.8 |
| 15 | 1.58 | 415 | 65 | 0.36 | 15.9 | 173 | 2.9 |
| 20 | 1.58 | 228 | 70 | 0.45 | 21.3 | 253 | 4.2 |

*PPI means visual pores per lineal inch.

EXAMPLES 4–12

Example 1 is repeated using the following polyether polyols in place of the specific one in Example 1. Example 4 is a comparison with a conventional polyether polyol, while Examples 5-12 are modified polyether polyols used according to the present invention. Air permeability of the foam of each example is shown.

| Example | Polyether polyol | Air perm. |
| --- | --- | --- |
| 4 (comparison) | CB | 133 |
| 5 | XB | 380 |
| 6 | XC | 448 |
| 7 | XD | 340 |
| 8 | XE | 425 |
| 9 | XF | 463 |
| 10 | XG | 518 |
| 11 | XH | 534 |
| 12 | XI | 542 |

Polyether polyol CB (Example 4) is a conventional poly(oxyethylene/oxypropylene) ether polyol.

Polyether polyol XB is BASF P994 LV Graft Polyol, which is a modified polyether polyol based on a poly(styrene coacrylonitrile) system.

Polyether polyols XC, XD, XF and XI are respectively Union Carbide's Niax E464, E543, E363 and E579 Polymer Polyols, which are modified polyether polyols based on a poly(styrene coacrylonitrile) system.

Polyether polyols XE and XG are respectively Dow XAS-10946 and XAS-10963 Copolymer Polyols, which are modified polyether polyols based on a poly(styrene coacrylonitrile) system.

Polyether polyol XH is Mobay E9232 PHD polyol, which is a modified polyether polyol based on a polyurea system.

It is understood that the foregoing detailed description is given merely by way of illustration and that many variations may be made therein without departing from the spirit of this invention.

What is claimed is:

1. In an improved process for in situ production of a reticulated open-cell polyurethane foam which comprises reacting a polyester/polyether polyol mixture with an aromatic polyisocyanate having a ratio of isocyanate moieties to aromatic moieties of about 2:1 in the presence of a catalyst and a blowing agent,
   the improvement comprises:
   said polyol mixture being
   (a) 80 to 95 parts by weight of the mixture of a polyester polyol and
   (b) 20 to 5 parts by weight of polyoxypropylene polyether polyol or a mixed poly(oxyethylene/oxypropylene) polyether polyol, having at least one of a polyurea or a polymer of ethylenically unsaturated monomers dispersed therein
   and a stabilizing surfactant for polyether polyurethane foam.

2. The process according to claim 1 wherein the polyisocyanate is toluene diisocyanate.

3. The process according to claim 1 wherein the polyether polyol (b) amounts to about 10 parts by weight of the polyol mixture.

4. The process according to claim 1 wherein the polyether polyol is a polyoxypropylene polyether polyol into which is dispersed poly(styrene coacrylonitrile).

5. The process according to claim 1 wherein the polyether polyol is a poly(oxyethylene/oxypropylene) polyether polyol into which is dispersed poly(styrene coacrylonitrile).

6. The process according to claim 1 wherein the polyether polyol is a poly(oxyethylene/oxypropylene) polyether polyol into which is dispersed polyurea.

7. The process according to claim 1 wherein the polyether polyol is a poly(oxypropylene) polyether polyol into which is dispersed polyurea.

8. In an improved process for in situ production of a reticulated open-cell polyurethane foam which comprises reacting a polyester/polyether polyol mixture with an aromatic polyisocyanate having a ratio of isocyanate moieties to aromatic moieties of about 2:1 in the presence of a catalyst and a blowing agent,
   the improvement comprises:
   said polyol mixture being
   (a) 80 to 95 parts by weight of the mixture of a polyester polyol and
   (b) 20 to 5 parts by weight of polyoxypropylene polyether polyol or a mixed poly(oxyethylene/oxypropylene) polyether polyol, having at least one of polystyrene, polyacrylonitrile, polyurea or poly(styrene coacrylonitrile) dispersed therein
   and a stabilizing surfactant for polyether polyurethane foam.

9. The process according to claim 8 wherein the polyisocyanate is toluene diisocyanate.

10. The process according to claim 8 wherein the polyether polyol (b) amounts to about 10 parts by weight of the polyol mixture.

11. The process according to claim 8 wherein the polyether polyol is a polyoxypropylene polyether polyol into which is dispersed poly(styrene coacrylonitrile).

12. The process according to claim 8 wherein the polyether polyol is a poly(oxyethylene/oxypropylene) polyether polyol into which is dispersed poly(styrene coacrylonitrile).

13. The process according to claim 8 wherein the polyether polyol is a poly(oxyethylene/oxypropylene) polyether polyol into which is dispersed polyurea.

14. The process according to claim 8 wherein the polyether polyol is a poly(oxypropylene) polyether glycol into which is dispersed polyurea.

* * * * *